(12) United States Patent
Schleicher et al.

(10) Patent No.: US 11,433,901 B2
(45) Date of Patent: Sep. 6, 2022

(54) SELECTION OF A MAIN OBJECT FOR AN ASSISTANCE FUNCTION OR AUTOMATED DRIVING FUNCTION OF A DRIVER ASSISTANCE SYSTEM OR DRIVING SYSTEM OF A MOTOR VEHICLE

(71) Applicant: Robert Bosch GmbH, Stuttgart (DE)

(72) Inventors: Matthias Schleicher, Villingen-Schwenningen (DE); Thomas Michalke, Weil der Stadt (DE); Jan Stellet, Stuttgart (DE); Maxim Dolgov, Renningen (DE); Ulrich Baumann, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 394 days.

(21) Appl. No.: 16/739,682

(22) Filed: Jan. 10, 2020

(65) Prior Publication Data

US 2020/0238997 A1 Jul. 30, 2020

(30) Foreign Application Priority Data

Jan. 24, 2019 (DE) .......................... 102019200828.3

(51) Int. Cl.
*B60W 40/04* (2006.01)
*G06N 3/08* (2006.01)
*G05D 1/02* (2020.01)
*G05D 1/00* (2006.01)
*G06N 3/04* (2006.01)

(52) U.S. Cl.
CPC .......... *B60W 40/04* (2013.01); *G05D 1/0088* (2013.01); *G05D 1/0221* (2013.01); *G06N 3/0454* (2013.01); *G06N 3/08* (2013.01); *B60W 2554/804* (2020.02)

(58) Field of Classification Search
CPC .......... B60W 40/04; B60W 2554/804; B60W 30/162; B60W 50/00; B60W 2050/0002; B60W 2420/52; G05D 1/0088; G05D 1/0221; G06N 3/0454; G06N 3/08; G06N 20/10; G06N 3/0427; G06N 7/005
See application file for complete search history.

(56) References Cited

U.S. PATENT DOCUMENTS

2019/0291728 A1* 9/2019 Shalev-Shwartz ........ B60T 7/22
2021/0094577 A1* 4/2021 Shalev-Shwartz ..... G06V 20/58

* cited by examiner

*Primary Examiner* — Marthe Y Marc-Coleman
(74) *Attorney, Agent, or Firm* — Norton Rose Fulbright US LLP; Gerard Messina

(57) ABSTRACT

A method for selecting a main object for an assistance function or automated driving function of a driver assistance system or driving system of a motor vehicle, the system containing object selection branches which include a first rule-based object selection branch for selecting a main object for the function and a second object selection branch, the second object selection branch including an artificial neural network for selecting a main object for the function, having the following steps: Aggregating of sensor data of the at least one sensor to form one or more object data records; Evaluating a novelty of a traffic situation characterized by the aggregated object data records in relation to training data of the artificial neural network; Switching between the object selection branches of the system, a rule-based object selection branch being used when the novelty of the traffic situation exceeds a threshold value.

12 Claims, 2 Drawing Sheets

SELECTION OF A MAIN OBJECT FOR AN ASSISTANCE FUNCTION OR AUTOMATED DRIVING FUNCTION OF A DRIVER ASSISTANCE SYSTEM OR DRIVING SYSTEM OF A MOTOR VEHICLE

CROSS REFERENCE

The present application claims the benefit under 35 U.S.C. § 119 of German Patent Application No. DE 102019200828.3 filed on Jan. 24, 2019, which is expressly incorporated herein by reference in its entirety.

FIELD

The present invention relates to a method for selecting a main object for an assistance function or automated driving function of a driver assistance system or driving system of a motor vehicle, the system including at least one sensor for sensing the traffic environment of the motor vehicle. The present invention further relates to a driver assistance system or driving system for a motor vehicle.

BACKGROUND INFORMATION

Some conventional semi-automated driver assistance systems adjust a vehicle speed in such a way that a preceding vehicle may be followed at a safe distance. Such vehicle-speed controllers are also referred to as ACC (Adaptive Cruise Control) systems. From various radar objects detected by a radar sensor, one main object is determined, the so-called target, which is to be followed. As a rule, the target is located in the traffic lane of the ego vehicle and is driving in front of the ego vehicle.

The target is determined based on rules, by an algorithm suitably generated and implemented in the driver assistance system.

SUMMARY

An object of the present invention is to provide a method as well as a corresponding driver assistance system and driving system, which makes it possible to select a target for an assistance function or automated driving function more efficiently and at the same time reliably.

This object may be achieved according to example embodiments of the present invention. Advantageous further developments and refinements of the present invention are described herein.

For instance, the automated driving function may include a function for driver assistance or a function for semi-automated, conditionally automated, highly automated or fully automated driving. In particular, the automated driving function may include a function for autonomous or semi-autonomous driving.

Correspondingly, the driver assistance system or driving system may include a system for driver assistance or for automated driving, for instance, especially for semi-automated, conditionally automated, highly automated or fully automated driving. In particular, the driving system may be an automated driving system or autonomous driving system.

The method makes it possible to use the second object selection branch in the normal case, and to select the main object for the function through the artificial neural network. This permits the use of a machine learning process (ML, Machine Learning). In comparison to a conventional, rule-based approach, the utilization of a neural network is able to markedly improve the performance of an object selection. In addition, it is advantageous that by aggregating sensor data, the size of the neural network may be kept relatively small. Thus, an efficient calculation is possible when using the neural network, and a small storage-space requirement results for the weights of the neural network. It is especially advantageous that by evaluating the novelty of the traffic situation characterized by the aggregated object data records in relation to the training data of the neural network, the reliability of the process may be increased considerably. It was determined that the performance of machine learning processes in the application case depends strongly on whether a data record to be processed or to be classified is sufficiently comparable to a data record utilized during the training of the learning process. In the extreme case, if a neural network is used exclusively, a systematically false evaluation of the input data records may take place. Because according to an example embodiment of the present invention, the novelty of the traffic situation is evaluated, in the event a novelty exceeds the threshold value, it is possible to switch over to the use of the rule-based object selection branch for selecting the main object for the assistance function or driving function. In this way, the advantages of a rule-based object selection may be combined with the advantages of an object selection with the aid of an artificial neural network, so that a method may be attained which is particularly reliable, and at the same time, as efficient as possible. In particular, it is made possible to combine the performance of a neural network with the demonstrable robustness of a classic, rule-based approach to object selection.

Preferably, in the second object selection branch, the artificial neural network is set up to use a plurality of object data records simultaneously as input variables for selecting the main object for the assistance function or driving function. Compared to an evaluation of specific individual object data records by a neural network and a selection based on the results of the evaluations, the simultaneous use of a plurality of object data records as input variables of the neural network makes it possible to use relationships between the objects characterized by the object data records as an additional information source, as well. Thus, for example, even in the case of missing or poor lane markings on the roadway, it may be inferred from relative positions between the objects, which of the objects is traveling in the traffic lane of the ego vehicle (also referred to as ego traffic lane), and is therefore possible, for instance, as main object for a driver assistance function.

For example, the at least one sensor may include a camera and/or a radar sensor and/or a lidar sensor.

The object data records for which the sensor data is aggregated may correspond to moving objects and/or stationary objects. For example, stationary objects may include a guardrail. Object data records of stationary objects may contain information about a road boundary, for instance. Thus, an object in the form of a guardrail may be used, for instance, to estimate a road boundary. For example, the rule-based object selection branch may be set up, using the position of the ego vehicle relative to the estimated road boundary and relative to detected dynamic objects, and possibly based on their position relative to the estimated road boundary, to ascertain which object is driving in front of the ego vehicle in the same traffic lane. If the sensor includes a camera, then lane markings detectable in the video image may also be used to select the main object.

For instance, the aggregated sensor data in the form of an object data record may correspond to one object like, e.g., a vehicle or a pedestrian. Thus, multiple object data records may correspond to a list of objects. Each object may be described in the object data record by a point in a state space, with the point being able to have one or more of the following elements, for example, including: a lateral position, a longitudinal position, a velocity, an acceleration, an object orientation, an extension such as length or width of the object in Cartesian coordinates, or variants of the variables indicated. In particular, the aggregating of sensor data may markedly reduce the scope of information as against the raw data (sensor data), especially in comparison to a video image or in comparison to a large number of radar detections which stem from the same object.

In the second object selection branch, the artificial neural network preferably has at least one folding layer adjacent to an input layer of the artificial neural network. A folding layer, also known as convolutional layer, is a layer in which the activity of each neuron is calculated via a discrete convolution corresponding to a convolution matrix or a filter kernel. The convolution of the input data (object data records) makes it possible to evaluate correlations between objects in the traffic environment in an especially efficient manner. The artificial neural network is thus preferably a convolutional artificial neural network. In that context, the convolutional layer corresponds to a number M of one-dimensional filters, which are able to highlight and combine individual object properties. For instance, such an object property may be the property of an object, that it is located to the left of the ego traffic lane and is increasing an acceleration (of the acceleration) in the direction of the ego lane. The filters, that is, the structure of the convolutional layer, are generated in automated fashion during training of the neural network with suitable training data records.

The evaluation of the novelty of a traffic situation characterized by aggregated object data records in relation to training data of the artificial neural network preferably includes an evaluation of a distance of a data tuple including the object data records, from a multidimensional probability distribution of such data tuples calculated from the training data.

For example, in the modeling of the multidimensional probability distribution, for all training data per training data record which corresponds to a traffic situation, one input data tuple equivalent to one or more aggregated object data records and corresponding to the traffic situation may be used as an input value (input data duple (tuple)) for the probability distribution to be calculated from the input values. The probability distribution therefore constitutes a representation of the training data.

In that context, a probability distribution may be determined for each input data tuple (tuple) corresponding to each traffic situation of the training data, the individual probability distributions being summed up for a probability distribution to be used for an evaluation of the novelty. The modeling of the training data with the aid of the multidimensional probability distribution has the advantage that the novelty of a traffic scene may be evaluated extensively, especially, e.g., in terms of all attributes of an object, how they correspond to an object data record, and/or in terms of the constellation of multiple objects in the traffic situation.

In one exemplary embodiment, the evaluation of a novelty of a traffic situation characterized by the aggregated object data records in relation to training data of the artificial neural network includes evaluation of a novelty of the traffic situation characterized by the aggregated object data records, in conjunction with additional data characterizing an environment scenario. For example, the additional data characterizing an environment scenario may include information about the weather (e.g., sun/rain/snow/fog), information about the presence of a tunnel (e.g., yes/no), and/or information about the presence of a road construction site (yes/no). Such data may be gathered from road traffic network information (e.g., tunnel), for instance, or be obtained through information services (construction sites) or additional sensors (weather). The consideration of additional data characterizing the environment scenario makes it possible in situations when, on the basis of the data characterizing the environment scenario, a relevant deviation results with respect to the training data, to switch over to a rule-based object selection branch, even if the object data records to be used by the neural network to select the main object match well with the training data. Consequently, the potential otherness of the traffic situation characterized by the additional data may be taken into account.

In addition, the subject matter of the present invention is a driver assistance system or driving system for a motor vehicle, having at least one sensor for sensing the traffic environment of the motor vehicle, and having an object selection unit for selecting a main object for an assistance function or automated driving function of the driver assistance system, one of the methods described above being implemented in the system.

In the following, an exemplary embodiment is explained in greater detail based on the figures.

DETAILED DESCRIPTION OF EXAMPLE EMBODIMENTS

Figure 1:
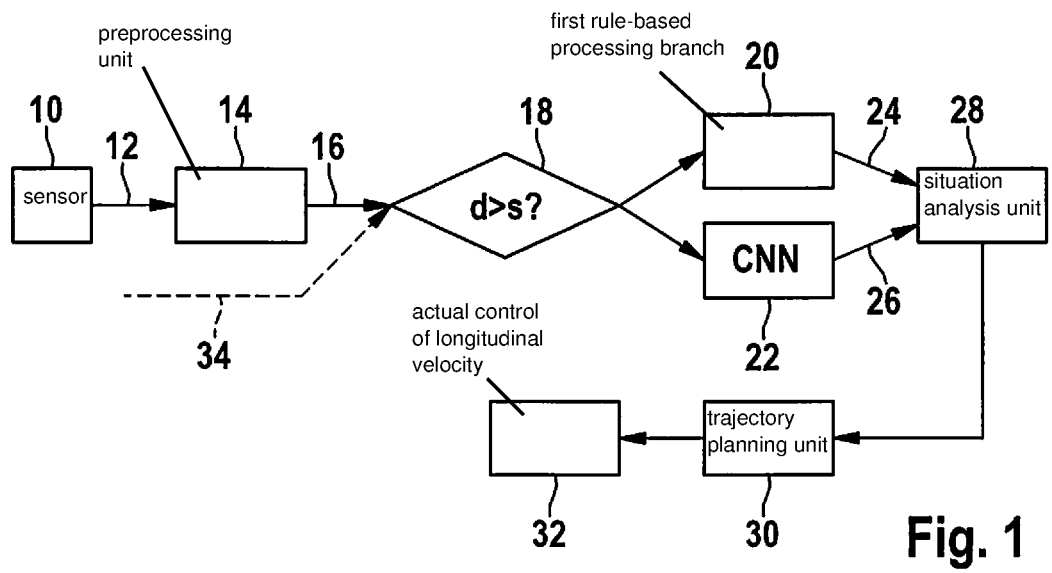
FIG. 1 shows a schematic diagram of a sensor system having two object selection branches.

The sensor system shown in FIG. 1 includes one or more sensors for sensing the traffic environment of the ego vehicle. One sensor 10 is shown by way of example. Sensor data 12 supplied by the sensors is preprocessed by a preprocessing unit 14. The preprocessing includes aggregating of sensor data 12 to form one or more object data records 16, where one object data record may correspond to one detected object. For example, an object data record X may be a vector or a list, which includes: a longitudinal position x, a lateral position y, an orientation $\varphi_z$, a longitudinal velocity $v_x$, a lateral velocity $v_y$, a longitudinal acceleration $a_x$, a lateral acceleration $a_y$:

$$X=(x, y, \varphi_z, v_x, v_y, a_x, a_y).$$

Object data record X is an element of a corresponding state space.

Aggregated object data records 16 are passed on to a novelty evaluator 18, which is described further below. Depending on whether the novelty exceeds a threshold value, the processing branches into a first rule-based processing branch 20 or a second processing branch, which includes a convolutional neural network (CNN) 22.

The novelty of the traffic situation is evaluated in relation to training data of artificial neural network 22.

If first object selection branch 20 is used, it selects a main object 24 as target for a driver assistance function in the form of an ACC speed controller. The driver assistance function may also be part of an automated driving function of an automated driving system of a motor vehicle.

If the second object selection branch having neural network 22 is used, neural network 22 selects a main object 26 as target for the driver assistance function.

Main object 24, 26 selected in each instance is passed on to the driver assistance function, which includes a situation analysis unit 28, a trajectory planning unit 30 and actual control 32 of the longitudinal velocity.

If novelty evaluator 18 recognizes that the data incoming from the output of preprocessing 14 differs sharply from data used in the context of the training of neural network 22, the processing branches to first rule-based object selection branch 20. On the other hand, if there is sufficient similarity between the data incoming at novelty evaluator 18 and the training data, the second object selection branch having neural network 22 is used. For example, the object selection branch not used in each case is switched off temporarily.

In addition, novelty evaluator 18 may be supplied with additional data 34 characterizing the environment scenario like, e.g., information about the weather, the presence of a tunnel, or the presence of a construction site. This additional information may also be taken into consideration in evaluating the novelty.

Figure 2:
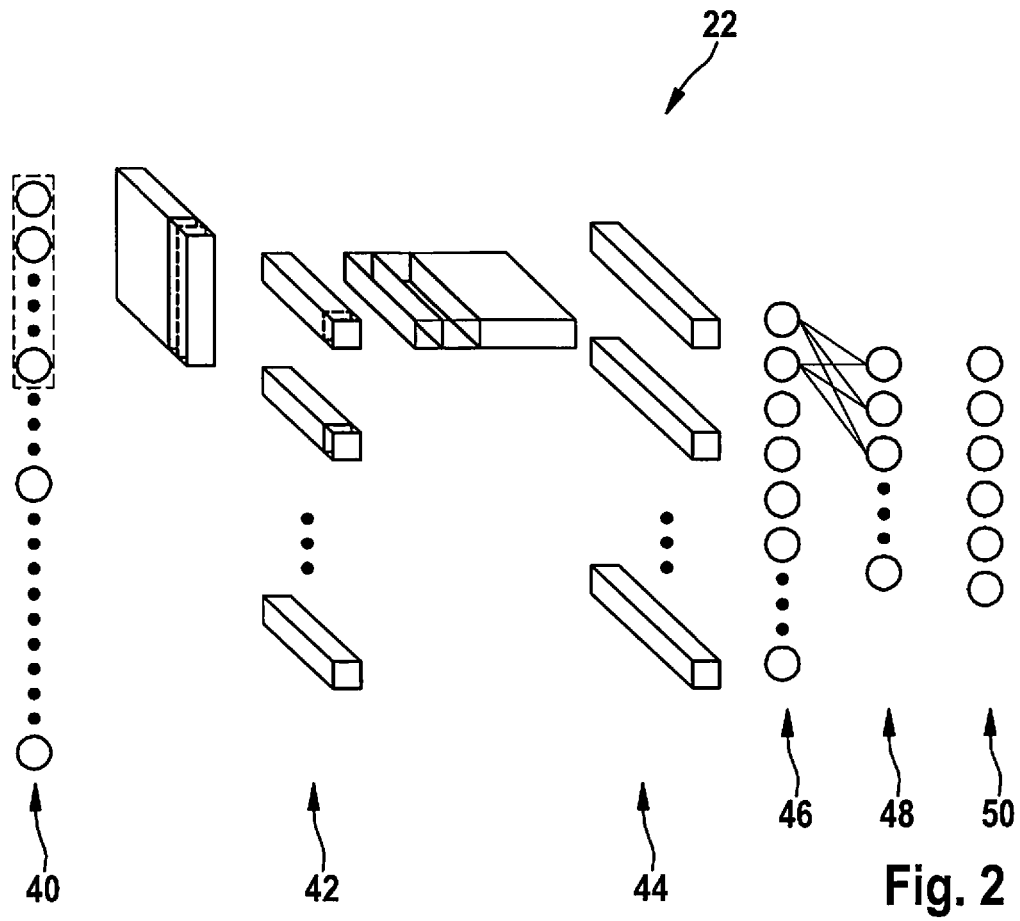
FIG. 2 shows a schematic representation of a convolutional neural network of an object selection branch.

FIG. 2 shows schematically an example for the structure of convolutional artificial neural network 22. Neural network 22 includes an input layer 40, a first convolutional processing layer 42 adjacent to it, a second convolutional processing layer 44, as well as further processing layers 46, 48 and an output layer 50. The number of layers described serves merely to illustrate the structure in principle, and may vary in practice.

At each input location, identified by a circle, input layer 40 contains an object data record 16. First and second layers 42, 44, which may also be referred to as convolutional filter, enable relationships between objects to be taken into consideration. For example, the data records identified by a dash-lined quadrangle at input layer 40 enter into the segment of layer 42 depicted in dash-lined fashion in layer 42.

The output locations of output layer 50, which are identified by circles, correspond in each case either to a classification that the object at an assigned input location represents the target, or the classification that no target is recognized.

Neural network 22 is permutation variant with respect to an interchange of the object data records present at the input locations.

Figure 3:
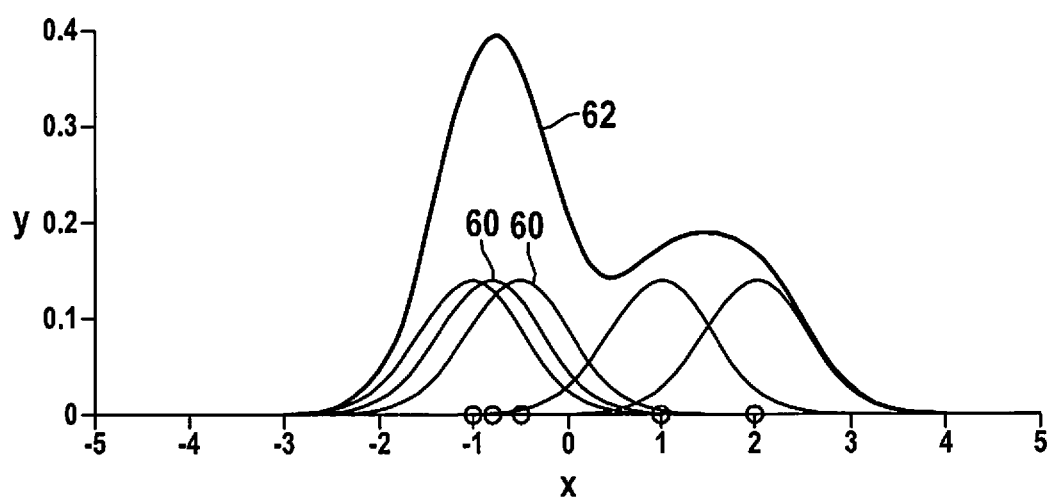
FIG. 3 shows a schematic representation to clarify the calculation of a probability distribution from training data of the neural network.

FIG. 3 shows schematically and in highly simplified fashion, the calculation of a probability distribution on the basis of the training data of neural network 22. Each input value x identified by a circle corresponds to a traffic situation of the training data, and in particular, may be a data tuple, which characterizes multiple objects present in the traffic situation.

For example, a Gaussian distribution 60 is assumed for each of the input values. Gaussian distributions 60 are combined to form a summed and normalized probability density 62.

If in the application case of the system, a data tuple is now pooled from the object data records aggregated in a traffic situation, then novelty evaluator 18 may calculate a distance d of the data tuple from probability density 62, which represents a measure for the novelty of the traffic situation relative to the training data. If the novelty thus calculated exceeds a threshold value s, as mentioned above, the process branches into first object selection branch 20. Otherwise, neural network 22 is used for the object selection.

For example, the following may be used as distance measure for distance d: the Mahalanobis distance, which corresponds to the calculation of a distance between a measured value and a Gaussian distribution; or the Kullback-Leibler divergence may be used, which corresponds to the calculation of a distance between two distributions. In order to obtain a distribution from the data tuple, the data tuple may be assumed as a Gaussian-distributed measured value. A sliding time window of, e.g., a few seconds may also be carried along in order to ascertain a true distribution of the data tuples obtained for the individual measuring cycles.

For example, on the assumption that respective data tuples are Gaussian-mixed-distributed, suitable probability distributions for the calculation of probability density 62 may be ascertained from the training data with the aid of what is known as Kernel Density Estimation (KDE), by use of a Dirichlet Process Gaussian Mixture Model (DGPMM), or with the aid of Exception Maximization (EM). Using all data tuples corresponding to the training data, a multidimensional distribution is thus produced.

In particular, the method described has the advantage that by recognizing the novelty of the traffic situation in time, it is possible to counter the risk that with increasing deviation of the actually occurring data from the training data, an exceedance of the generalizing capability of the neural network whereby an unforeseeable malfunction of the neural network could occur, may be avoided.

The use of a convolutional network layer as first layer of neural network 22 may lead to a sharp improvement in the performance of the network, which becomes apparent, e.g., in an improvement of the correct classification rate. In general, the correct classification rate may be calculated as $$\text{correct classification rate} = (TP+TN)/(TP+TN+FP+FN),$$

where TP (True Positive) represents the number of correctly positive classifications, TN (True Negative) represents the number of correctly negative classifications, FP (False Positive) represents the number of falsely positive classifications and FN (False Negative) represents the number of falsely negative classifications.

The use of a neural network may further have the advantage that even special cases of traffic situations may be learned through suitable training data. For example, special cases may include:

(1) The ACC must react very early to a vehicle swinging in in front of the ego vehicle, even before the vehicle swinging in has arrived completely in the traffic lane of the ego vehicle;

(2) During a lane change by the ego vehicle, the ACC must discard (i.e., let go of) a selected target in the old traffic lane of the ego vehicle early on, even before the ego vehicle has arrived completely in the new lane, in order to allow an acceleration of the ego vehicle without noticeable latency; and (3) When a target in front of the ego vehicle begins to leave the lane, there must be a changeover early on to a new target in front of the old target in the ego traffic lane.

What is claimed is:

1. A method for a driver assistance or driving system of a motor vehicle, the method comprising:
   using at least one sensor to sense a traffic environment of the motor vehicle;

using an object selection unit, which uses object selection branches that include a first rule-based object selection branch for selecting a main object for the function and a second object selection branch, the second object selection branch, including an artificial neural network, for selecting the main object for the function;

aggregating sensor data of the at least one sensor to form one or more object data records;

evaluating a novelty of a traffic situation characterized by the aggregated object data records in relation to training data of the artificial neural network; and switching between the first rule-based and the second object selection branches of the system, the first rule-based object selection branch being used when the novelty of the traffic situation exceeds a predetermined threshold value.

2. The method as recited in claim 1, wherein in the second object selection branch, the artificial neural network is set up to use a plurality of object data records simultaneously as input variables for selecting the main object for the function.

3. The method as recited in claim 1, wherein in the second object selection branch, the artificial neural network has at least one convolutional layer adjacent to an input layer of the artificial neural network.

4. The method as recited in claim 1, wherein the evaluation of the novelty of a traffic situation characterized by the aggregated object data records in relation to the training data of the artificial neural network includes an evaluation of a distance of a data tuple including the object data records, from a multidimensional probability distribution of such data tuples calculated from the training data.

5. The method as recited in claim 1, wherein the evaluation of the novelty of the traffic situation characterized by the aggregated object data records in relation to the training data of the artificial neural network includes an evaluation of a novelty of the traffic situation characterized by the aggregated object data records, in conjunction with additional data characterizing an environment scenario.

6. The method as recited in claim 1, wherein the function is a function for controlling a longitudinal velocity of the motor vehicle for following a preceding vehicle, and a preceding vehicle which is to be followed is selected as main object selection.

7. The driver assistance or driving system for a motor vehicle, comprising:

at least one sensor to sense a traffic environment of the motor vehicle;

an object selection unit to select a main object for an assistance function or automated driving function of the system, the object selection unit including object selection branches which include a first rule-based object selection branch for selecting a main object for the function and a second object selection branch, the second object selection branch including an artificial neural network for selecting a main object for the function, the system being configured to perform the following:

aggregating sensor data of the at least one sensor to form one or more object data records;

evaluating a novelty of a traffic situation characterized by the aggregated object data records in relation to training data of the artificial neural network; and switching between the first rule-based object selection and second object selection branches, the first rule-based object selection branch being used when the novelty of the traffic situation exceeds a predetermined threshold value.

8. The system as recited in claim 7, wherein in the second object selection branch, the artificial neural network is set up to use a plurality of object data records simultaneously as input variables for selecting the main object for the function.

9. The system as recited in claim 7, wherein in the second object selection branch, the artificial neural network has at least one convolutional layer adjacent to an input layer of the artificial neural network.

10. The system as recited in claim 7, wherein the evaluating of the novelty of a traffic situation characterized by the aggregated object data records in relation to the training data of the artificial neural network includes an evaluation of a distance of a data tuple including the object data records, from a multidimensional probability distribution of such data tuples calculated from the training data.

11. The system as recited in claim 7, wherein the evaluating of the novelty of the traffic situation characterized by the aggregated object data records in relation to the training data of the artificial neural network includes an evaluation of a novelty of the traffic situation characterized by the aggregated object data records, in conjunction with additional data characterizing an environment scenario.

12. The system as recited in claim 7, wherein the function is a function for controlling a longitudinal velocity of the motor vehicle for following a preceding vehicle, and a preceding vehicle which is to be followed is selected as main object selection.

\* \* \* \* \*